United States Patent
Okumura

(10) Patent No.: US 8,320,050 B2
(45) Date of Patent: Nov. 27, 2012

(54) ZOOM LENS AND IMAGE PICKUP APPARATUS INCLUDING THE SAME

(75) Inventor: Tetsuichiro Okumura, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/206,308

(22) Filed: Aug. 9, 2011

(65) Prior Publication Data

US 2012/0044576 A1 Feb. 23, 2012

(30) Foreign Application Priority Data

Aug. 20, 2010 (JP) ................................. 2010-184920

(51) Int. Cl.
*G02B 15/14* (2006.01)

(52) U.S. Cl. ........ 359/682; 359/680; 359/684; 359/686; 359/689; 359/691; 359/740; 359/715; 359/716; 359/717; 359/749; 359/753

(58) Field of Classification Search .......... 359/680–686, 359/689, 691, 713–717, 740, 749, 753
See application file for complete search history.

(56) References Cited

U.S. PATENT DOCUMENTS

| 5,831,773 | A | 11/1998 | Sato | |
|---|---|---|---|---|
| 6,496,310 | B2 * | 12/2002 | Fujimoto | 359/680 |
| 2005/0041302 | A1 * | 2/2005 | Ozaki et al. | 359/680 |
| 2006/0187556 | A1 * | 8/2006 | Inoko | 359/680 |
| 2010/0073776 | A1 * | 3/2010 | Suzuki | 359/682 |

FOREIGN PATENT DOCUMENTS

JP 2002-311330 A 10/2002

* cited by examiner

*Primary Examiner* — Evelyn A. Lester

(74) *Attorney, Agent, or Firm* — Canon U.S.A., Inc. IP Division

(57) ABSTRACT

A zoom lens includes in order from an object side to an image side and arranged along an optical axis thereof, a first lens unit having a negative refractive power, and a second lens unit having a positive refractive power. A distance between each lens unit changes when zooming from a wide-angle end to a telephoto end. The first lens unit includes a first lens sub-unit including a positive lens element and a negative lens element, and having a negative refractive power, and a second lens sub-unit including a single negative lens element. Focusing is performed by moving the second lens sub-unit in an optical axis direction, a focal length of the second lens sub-unit f1b and a focal length of the entire zoom lens fw at a wide-angle end are suitably set based on predetermined mathematical expressions.

8 Claims, 11 Drawing Sheets

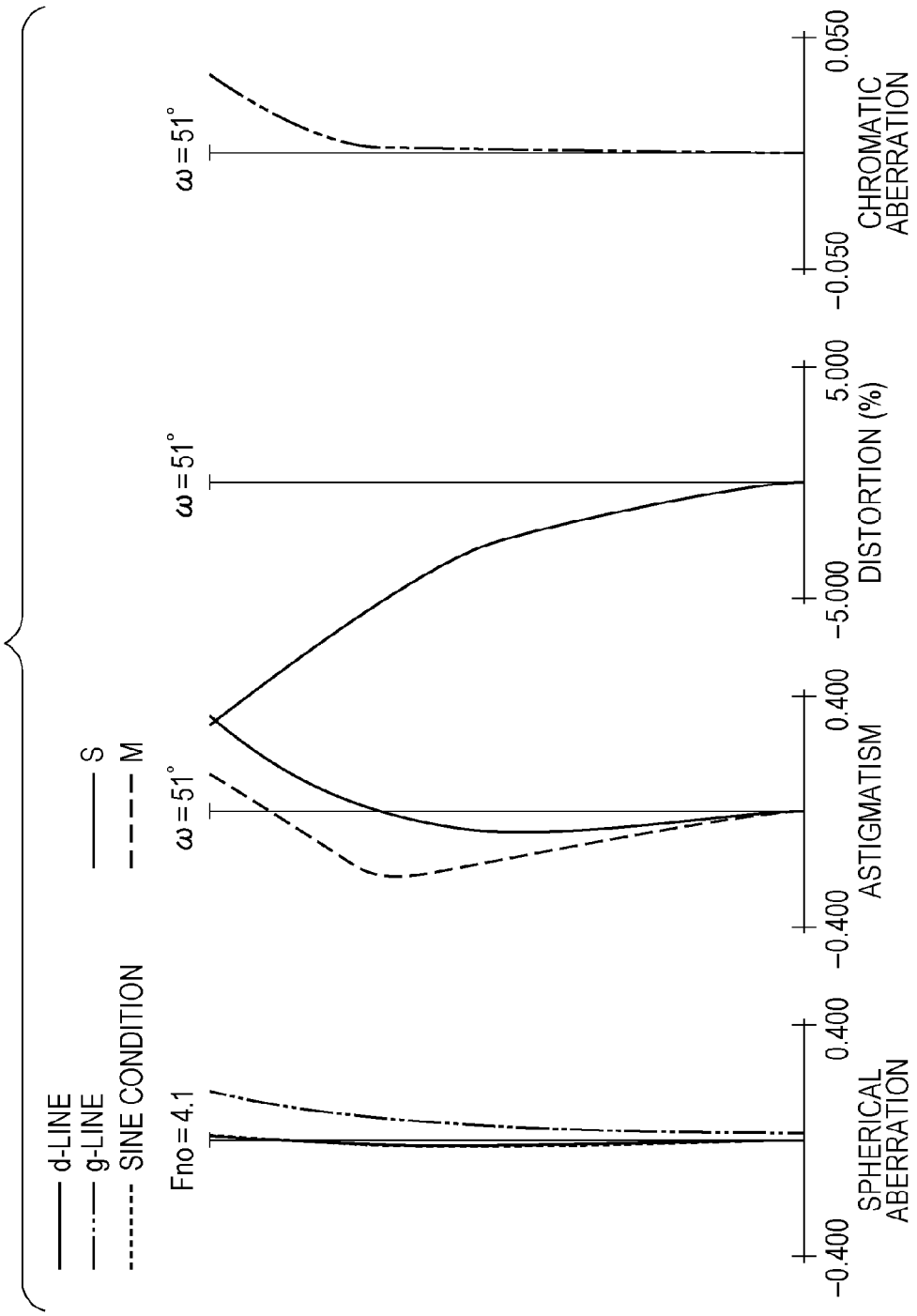

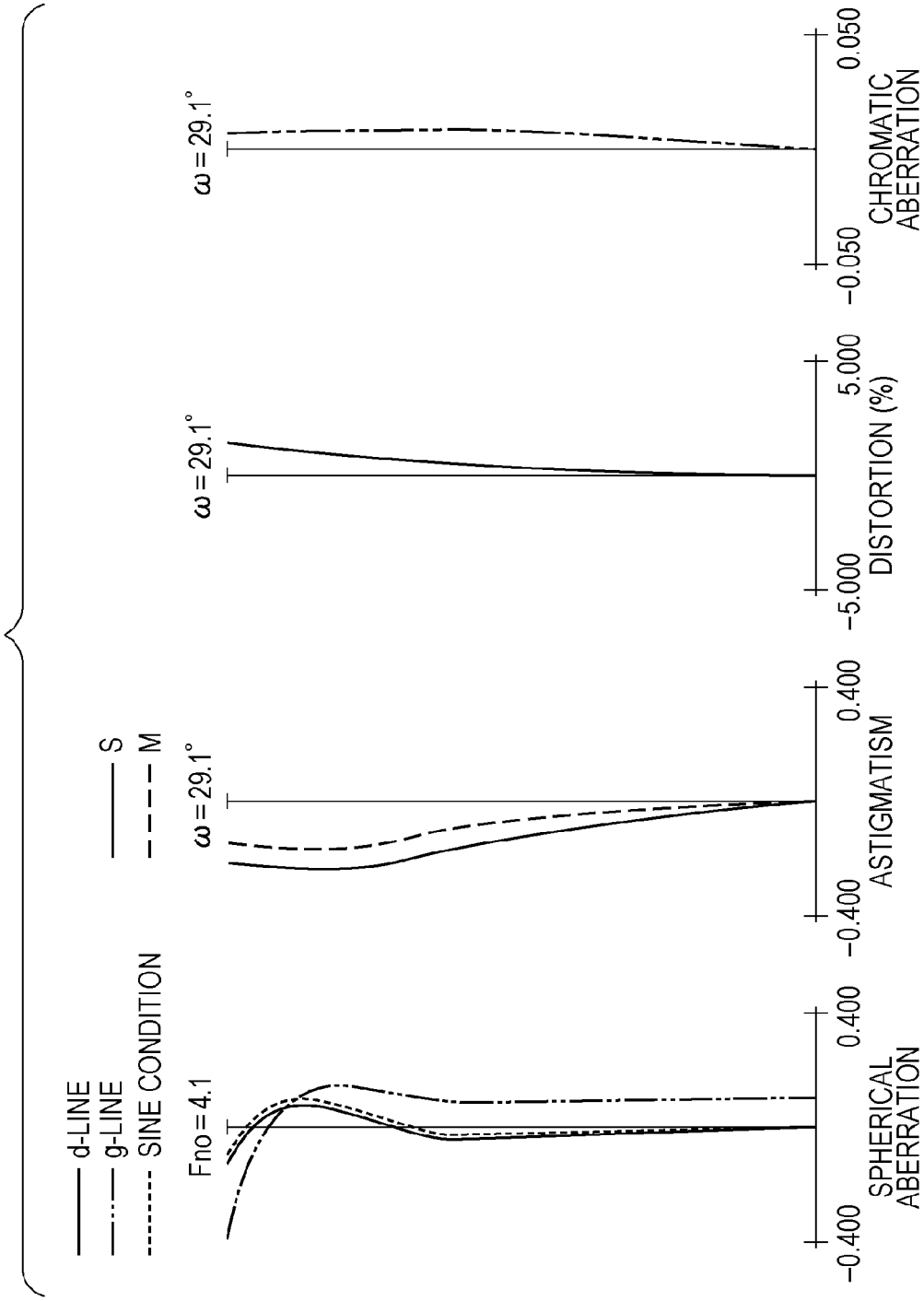

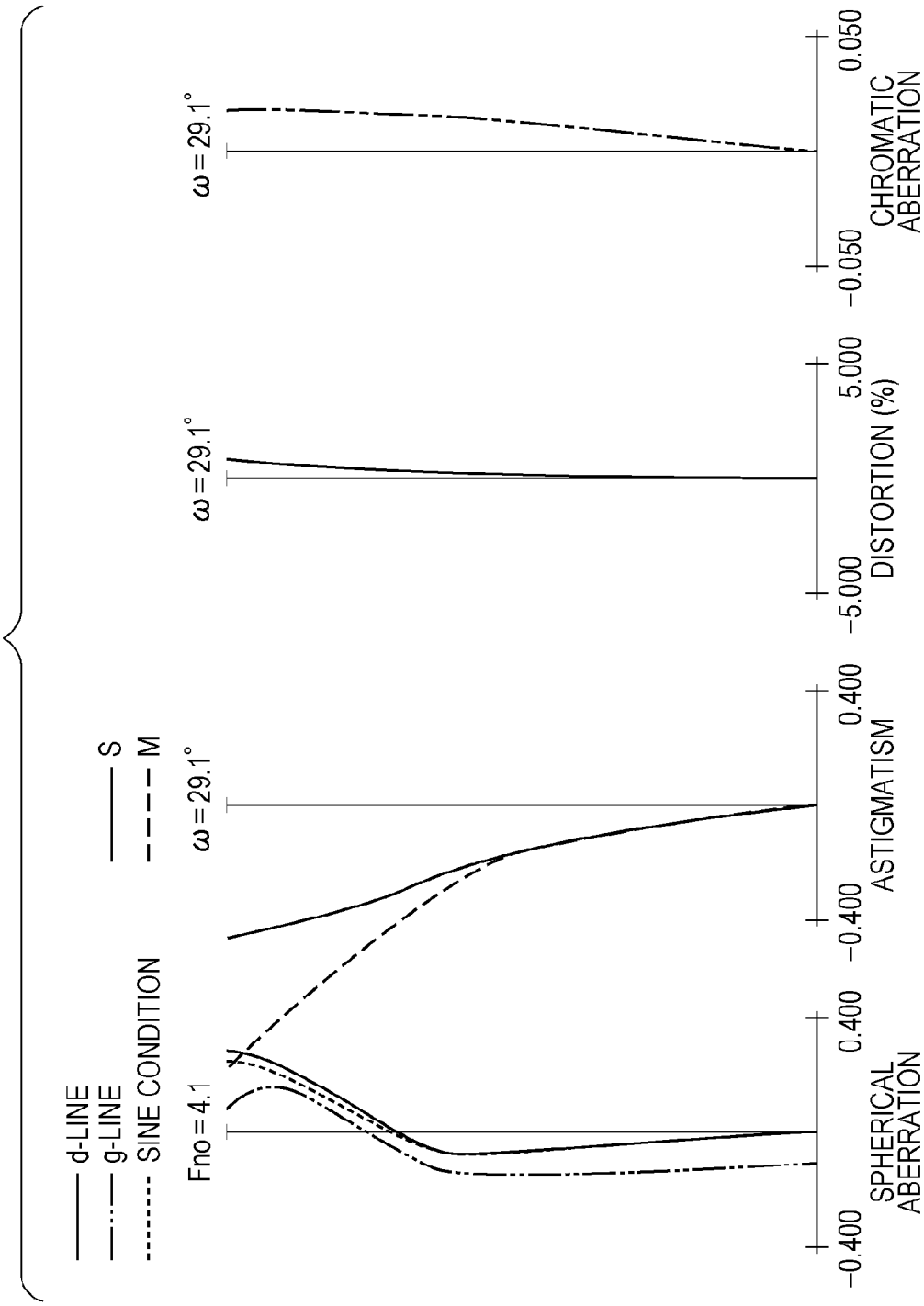

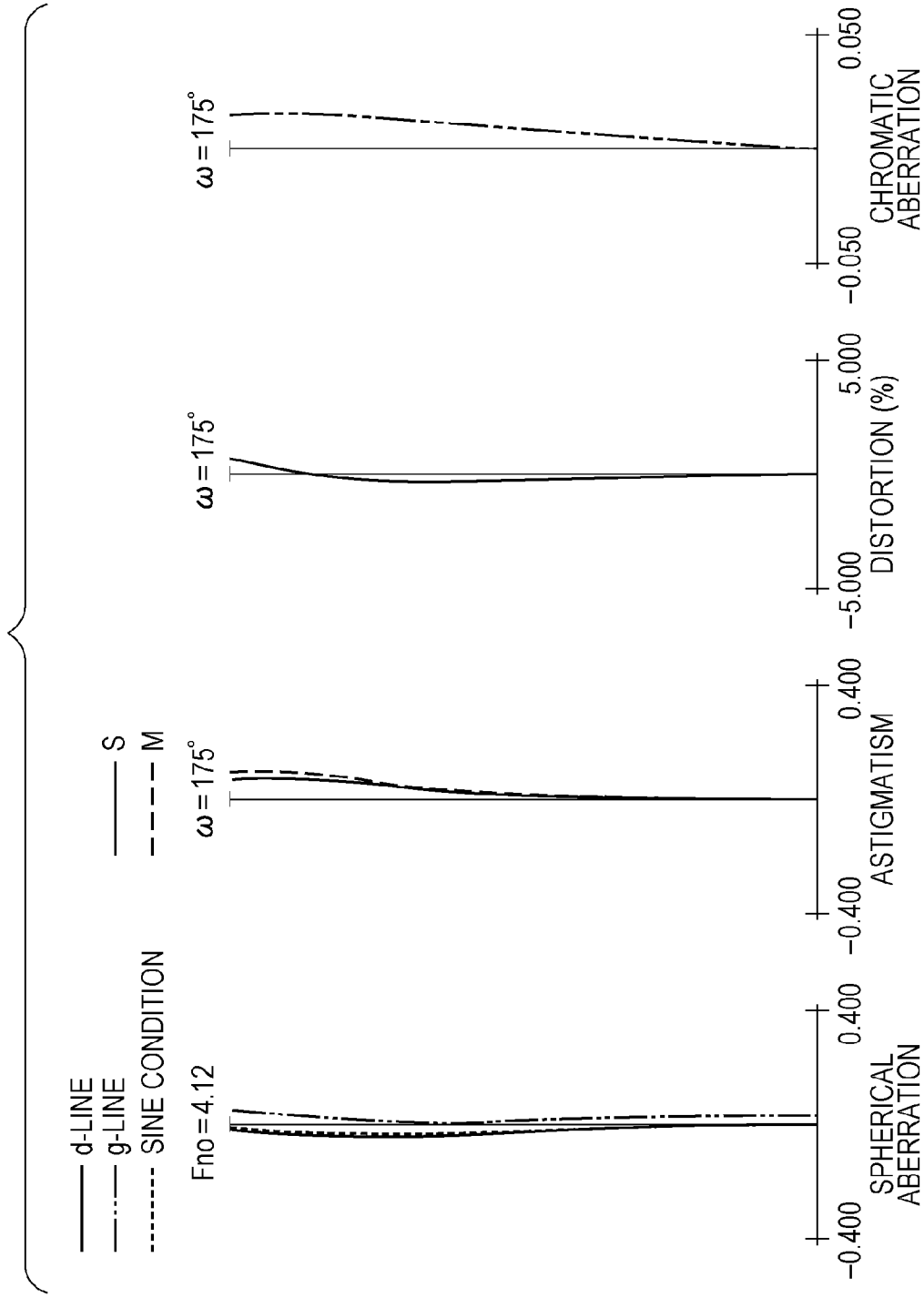

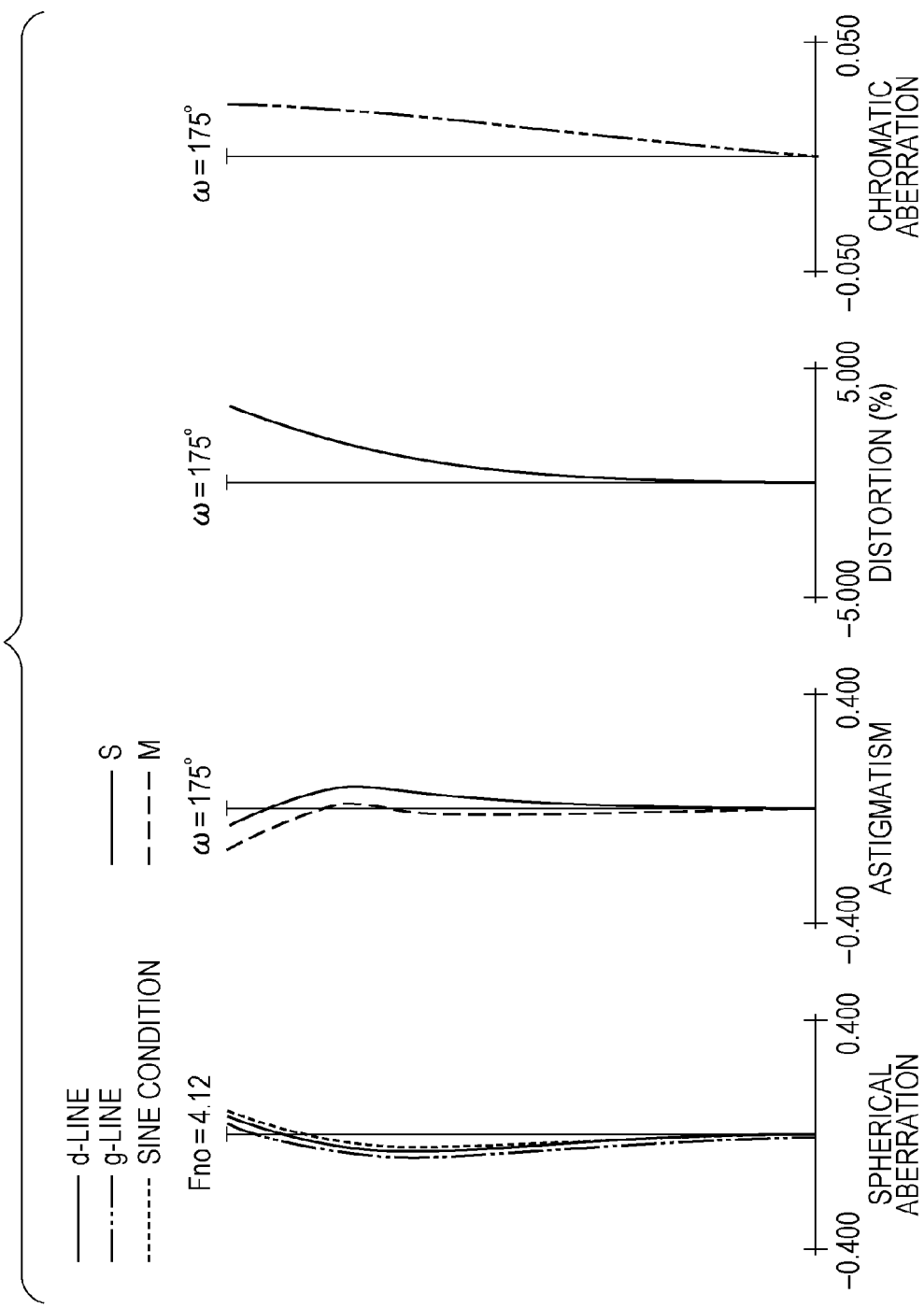

ZOOM LENS AND IMAGE PICKUP APPARATUS INCLUDING THE SAME

BACKGROUND OF THE INVENTION

1. Field of the Invention

The present invention relates to a zoom lens and an image pickup apparatus equipped with the zoom lens. The zoom lens is suitable to, for example, digital cameras, video cameras, silver-halide film cameras, monitoring cameras, television cameras, and the like.

2. Description of the Related Art

As image pickup apparatuses, digital single-lens reflex cameras (D-SLRs) are widely used. D-SLRs include camera bodies that include image pickup sensors such as a charge-coupled device (CCD) sensor or complementary metal-oxide semiconductor (CMOS) sensor, and image pickup lenses that form optical images on surfaces of image pickup sensors. Today, the D-SLRs have a function of taking movies in addition to a function of taking still images. For an automatic focusing operation in taking movies with a D-SLR, a high-frequency detecting method, which is called a contrast detection auto-focus method (contrast detection AF method), is widely used. The contrast detection AF method evaluates an in-focus state of an image taking lens by detecting a high-frequency component in an imaging signal.

In a D-SLR camera using the contrast detection AF method, the focus lens unit vibrates in an optical axis direction at a high speed (hereinafter referred to as "wobbling") in order to detect a direction of deviation from an in-focus state. A signal component in a particular frequency band of an image area is detected from an output signal from an image pickup sensor, and an optimal position of the focus lens unit where the image taking lens is in-focus is calculated. After that, the focus lens unit is moved to the optimal position and focusing is complete.

When a movie is taken, in order to prevent an uncomfortable sensation such as flickering from occurring, the focus lens unit needs to be driven at a high speed during wobbling. Thus, when the focus lens unit is large in size, a motor and an actuator that drive the focus lens unit at a high speed become larger, thereby increasing the size of an image pickup apparatus.

As the image taking lens used for the D-SLR, there is a demand for a zoom lens having a wide field angle and a long back focus distance. To meet this demand, a negative-lead zoom lens is known. In a negative-lead type zoom lens, a lens unit having a negative refractive power is disposed on the side closest to the object to be imaged. As a negative-lead zoom lens, a wide field angle zoom lens is known, which facilitates high-speed focusing by moving part of a first lens unit having a negative refractive power in the optical axis direction.

Japanese Patent Laid-Open No. 2002-311330 discloses a zoom lens that includes, sequentially from the object side to an image side, a first lens unit having a negative refractive power, a second lens unit having a positive refractive power, a third lens unit having a negative refractive power, and a fourth lens unit having a positive refractive power, in which a cemented lens element, which is part of the first lens unit, is used as a focus lens unit.

U.S. Pat. No. 5,831,773 discloses a zoom lens that includes, sequentially from the object side to the image side, a first lens unit having a negative refractive power and a second lens unit having a positive refractive power, in which a negative lens element on the side closest to the object in the first lens unit is used as the focus lens unit.

The negative-lead zoom lens, which has an asymmetrical lens structure relative to an aperture stop, tends to exhibit large variations in aberrations in focusing. In particular, when focusing is performed by moving a small and right lens unit that is part of the first lens unit having a negative refractive power in order to make automatic focusing speed be faster, variations in chromatic aberration increases. This makes it difficult to achieve high optical performance in a whole range of the object distance.

Thus, in order to ensure a long back focus distance, enlarge a field angle, and achieve high-speed automatic focus detection, it is important to suitably set a lens structure of the first lens unit, which has a negative refractive power and includes a focus lens unit.

SUMMARY OF THE INVENTION

A zoom lens according to the present invention includes a first lens unit having a negative refractive power, and a second lens unit having a positive refractive power, in which the first lens unit and the second lens unit are arranged sequentially from an object side to an image side and disposed along an optical axis of the zoom lens. A distance between each lens unit changes when zooming from a wide-angle end to a telephoto end. The first lens unit includes a first lens sub-unit including a positive lens element and a negative lens element, and has a negative refractive power, and a second lens sub-unit including a single negative lens element. In the zoom lens, focusing is performed by moving the second lens sub-unit in an optical axis direction; and, when a focal length of the second lens sub-unit is f1b and a focal length of the entire zoom lens at the wide-angle end is fw, the following conditional expression is satisfied:

$$-0.4 < fw/f1b < -0.1.$$

Further features of the present invention will become apparent from the following description of exemplary embodiments with reference to the attached drawings.

BRIEF DESCRIPTION OF THE DRAWINGS

FIGS. 2A and 2B illustrate aberrations of the zoom lens at the wide-angle end, when the zoom lens is focused on an object at infinity and on an object at a short distance, respectively, according to the first embodiment of the present invention.

FIGS. 3A and 3B illustrate aberrations of the zoom lens at the telephoto end, when the zoom lens is focused on an object at infinity and on an object at a short distance, respectively, according to the first embodiment of the present invention.

FIGS. 5A and 5B illustrate aberrations of the zoom lens at the wide-angle end, when the zoom lens is focused on an object at infinity and on an object at a short distance, respectively, according to the second embodiment of the present invention.

FIGS. 6A and 6B illustrate aberrations of the zoom lens at the telephoto end, when the zoom lens is focused on an object at infinity and on an object at a short distance, respectively, according to the second embodiment of the present invention.

DESCRIPTION OF THE EMBODIMENTS

Embodiments of a zoom lens according to the present invention and an image pickup apparatus including the zoom lens will be described in detail below with reference to the accompanying drawings. The zoom lens according to the present invention includes a first lens unit having a negative refractive power and a second lens unit having a positive refractive power sequentially from an object side to an image side. The distance between the lens units changes during zooming. The first lens unit includes a first-a lens unit (first lens sub-unit) including positive and negative lens elements and having a negative refractive power, and a first-b lens unit (second lens sub-unit) including a single negative lens element. Focusing is performed by moving the first-b lens unit in an optical axis direction.

Figure 1A:
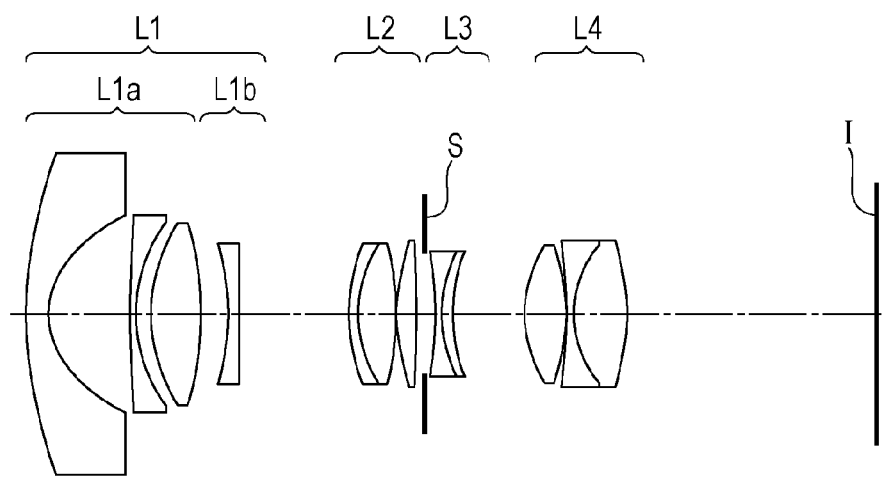
FIGS. 1A and 1B are sectional views of lenses of a zoom lens at a wide-angle end and at a telephoto end, respectively, and illustrate movement loci during zooming, according to a first embodiment of the present invention.
Figure 1B:
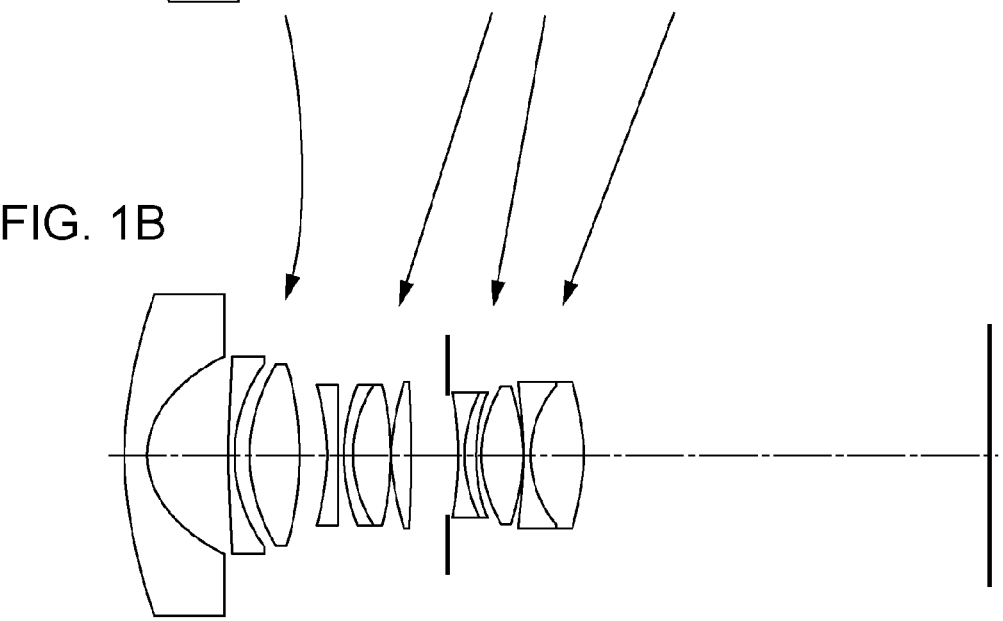
Figure 2B:
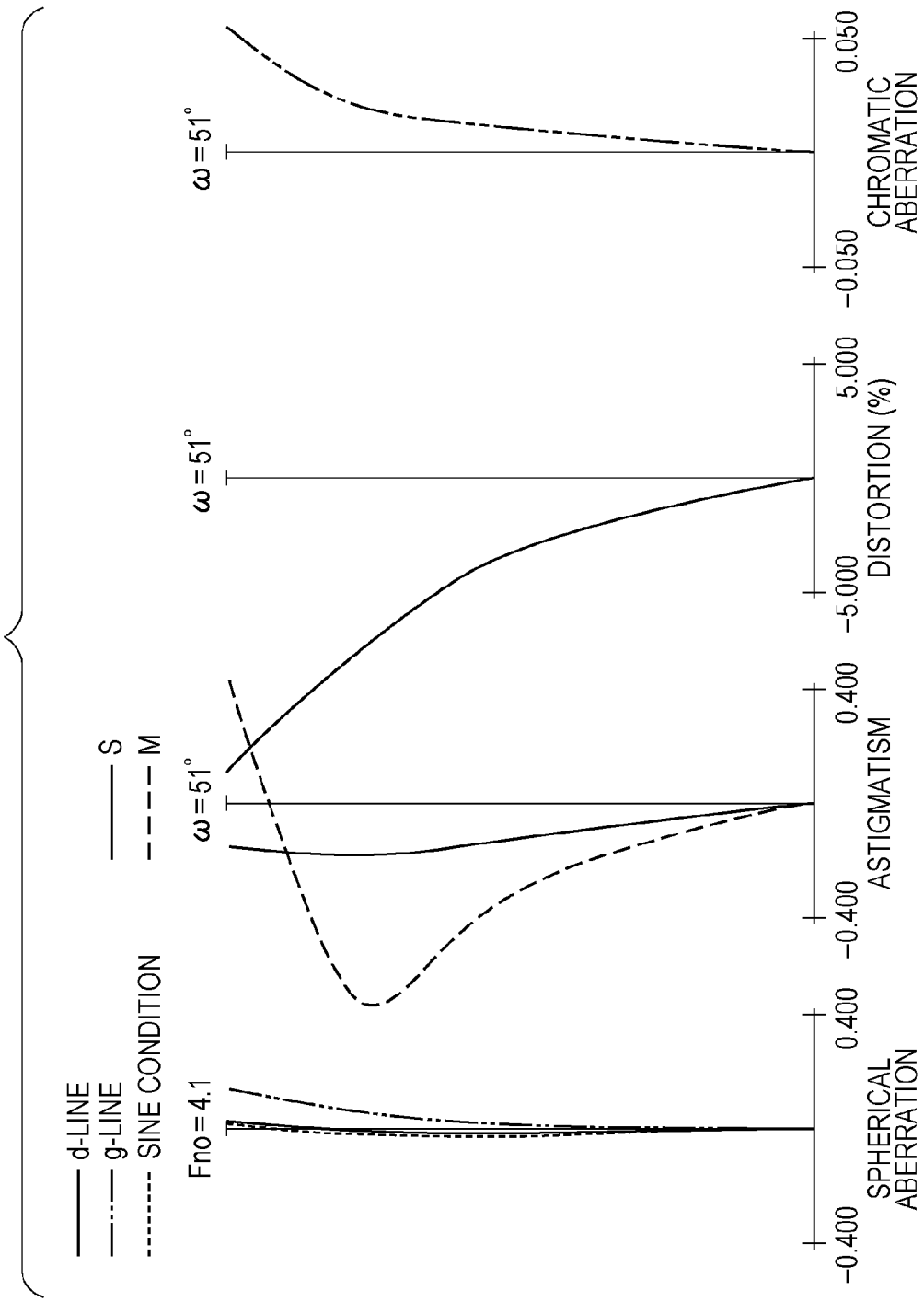
Figure 4A:
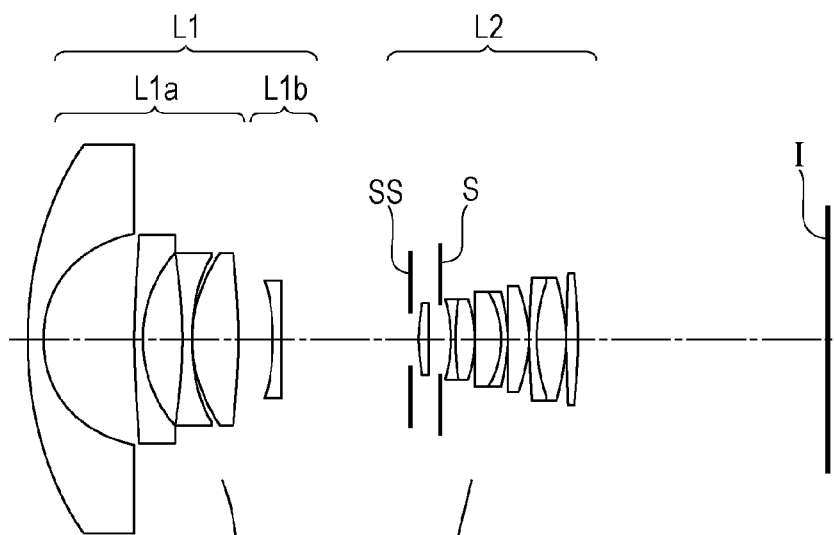
FIGS. 4A and 4B are sectional views of lenses of a zoom lens at a wide-angle end and at a telephoto end, and illustrate movement loci during zooming, according to a second embodiment of the present invention.
Figure 4B:
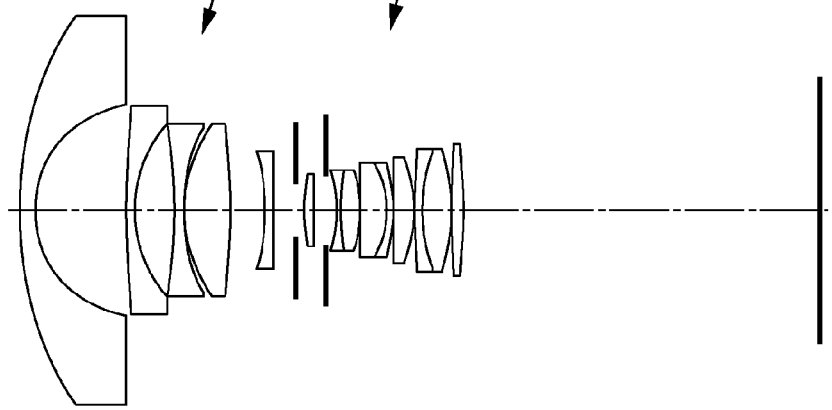

FIGS. 1A and 1B are sectional views of lenses of the zoom lens of a first embodiment according to the present invention at the wide-angle end (short focal distance end) and at a telephoto end (long focal distance end), respectively. FIGS. 2A and 2B illustrate aberrations when the zoom lens of the first embodiment at the wide-angle end is focused on an object at infinity and on an object at a short distance (object distance is 280 mm), respectively. FIGS. 3A and 3B illustrate aberrations when the zoom lens of the first embodiment according to the present invention at the telephoto end is focused on an object at infinity and on an object at a short distance (object distance is 280 mm), respectively. FIGS. 4A and 4B are sectional views of lenses of the zoom lens of a second embodiment at the wide-angle end and at the telephoto end, respectively.

Figure 5B:
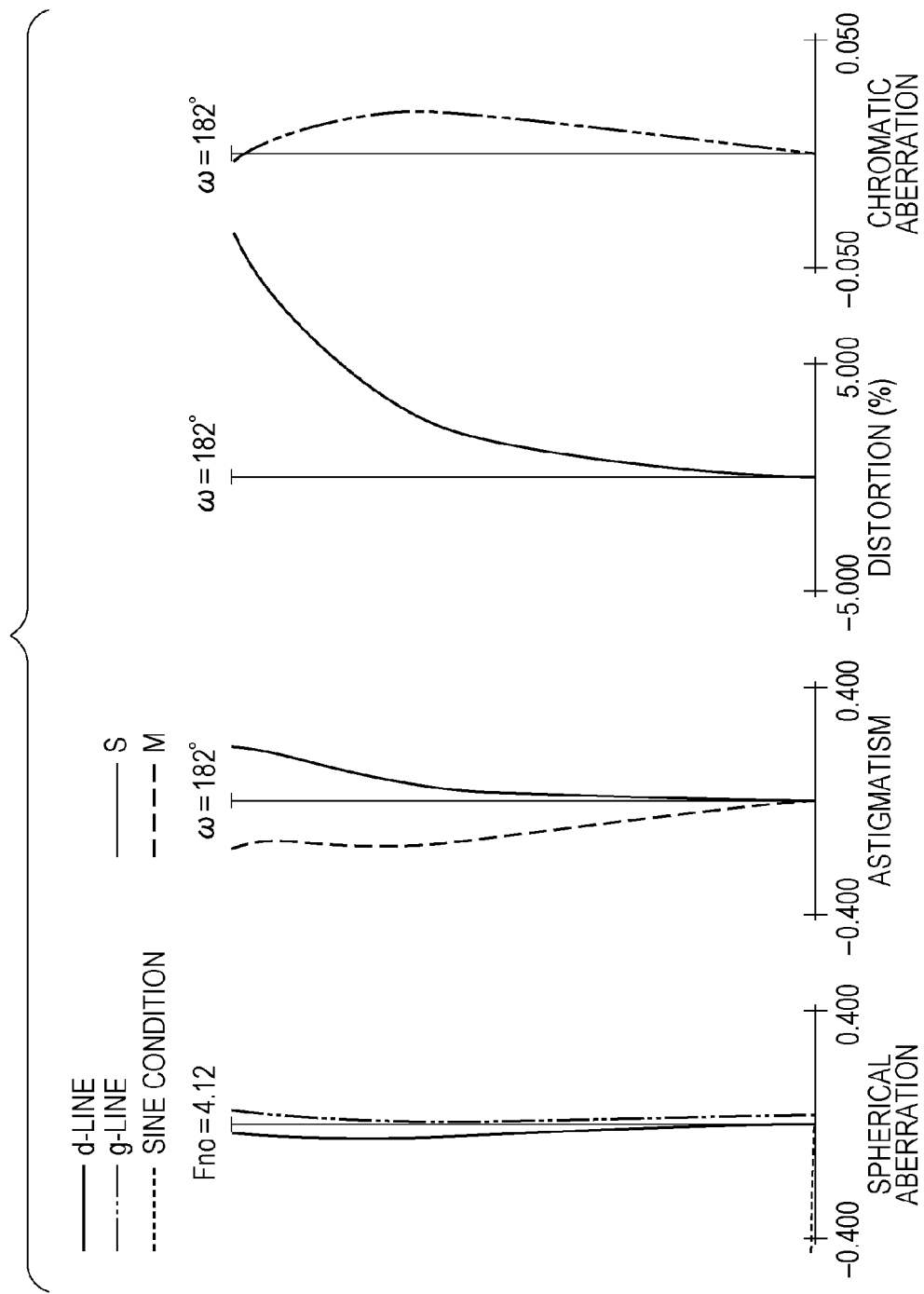
Figure 6B:
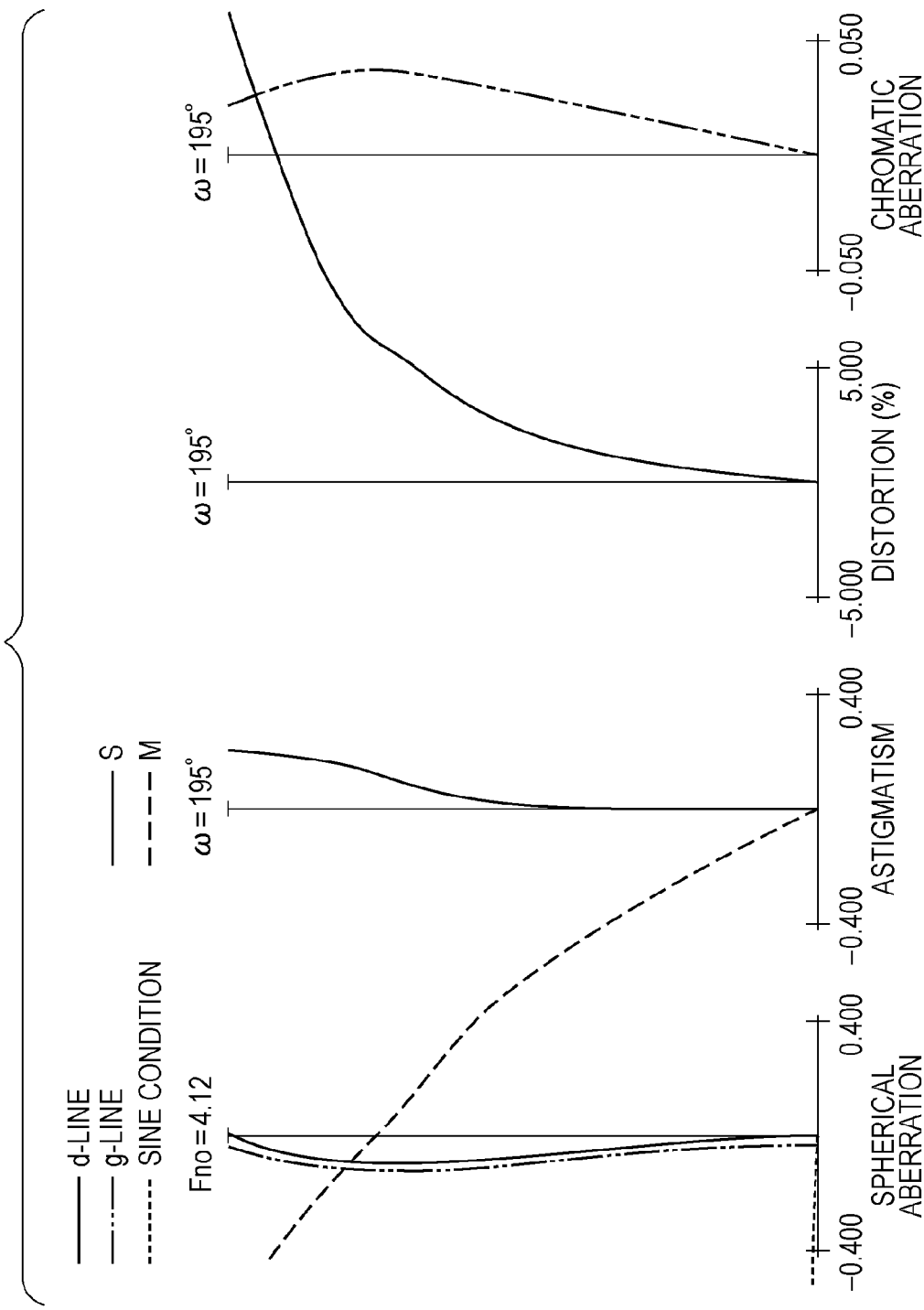
Figure 7:
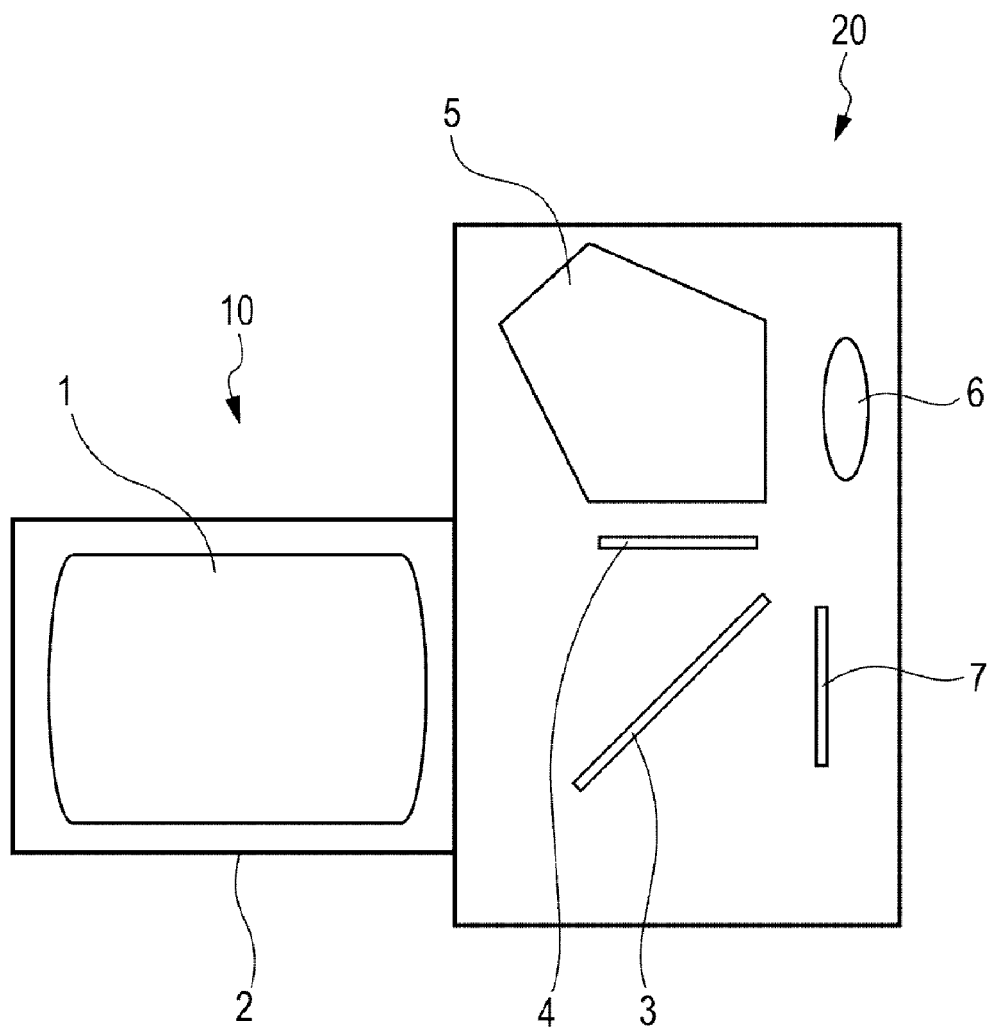
FIG. 7 is a schematic diagram illustrating an image pickup apparatus equipped with a zoom lens according to an embodiment of the present invention.

FIGS. 5A and 5B illustrate aberrations when the zoom lens of the second embodiment at the wide-angle end is focused on an object at infinity and on an object at a short distance (object distance is 150 mm), respectively. FIGS. 6A and 6B illustrate aberrations when the zoom lens of the second embodiment according to the present invention at the telephoto end is focused on an object at infinity and on an object at a short distance (object distance is 150 mm), respectively. FIG. 7 is a schematic diagram illustrating a main portion of a single-lens reflex camera (image pickup apparatus) including the zoom lens according to the present invention.

The zoom lens of each embodiment is an image taking optical system (optical system) used for an image pickup apparatus such as a video camera, a digital camera, and silver-halide film camera. In each of the sectional views of lenses, the left side is the object side (front) and the right side is the image side (rear). In each of the sectional views of lenses, numbers indicate order of lens units from the object side. Thus, when a number is represented by i (i being a positive integer, e.g., 1, 2, 3 . . . ), Li refers to an ith lens unit counted from the object side towards the image side. "S" denotes an aperture stop. "SS" denotes an F-number stop (sub-aperture). "I" denotes an image plane, which corresponds to an image pickup surface of a solid-state image pickup device (photoelectric conversion device) such as a charge-coupled device (CCD) sensor or a complementary metal-oxide semiconductor (CMOS) sensor when the zoom lens is used as an image taking optical system for a video camera or a digital still camera, or corresponds to a film plane when the zoom lens is used for a silver-halide film camera.

Arrows each indicate a movement locus of each lens unit during zooming from the wide-angle end to the telephoto end.

In spherical aberration charts, d-lines (solid lines), g-lines (two-dot chain lines), and sine conditions (dotted lines) are illustrated. In astigmatism charts, "M"s and "S"s respectively denote meridional image planes and sagittal image planes of the d-lines. "Fno" denotes an F-number, and "ω" denotes a half angle of view. In each of the following embodiments, the terms wide-angle end and telephoto end refer to zooming positions when a magnification-varying lens unit is positioned at the respective ends of a mechanically movable range along the optical axis.

The zoom lens of the first embodiment illustrated in FIGS. 1A and 1B includes, sequentially (in order) from the object side to the image side, a first lens unit L1 having a negative refractive power, a second lens unit L2 having a positive refractive power, a third lens unit L3 having a negative refractive power, and a fourth lens unit L4 having a positive refractive power. The first lens unit L1 includes, sequentially from the object side, a first-a lens unit L1a having a negative refractive power and a first-b lens unit L1b for focusing having a negative refractive power. The first-a lens unit L1a includes, sequentially from the object side to the image side, a negative lens element having a meniscus shape and having a convex surface on the object side, a negative lens element having a meniscus shape and having a convex surface on the object side, and a positive lens element. The first-b lens unit L1b includes a single negative lens element.

The second lens unit L2 includes, sequentially from the object side to the image side, a cemented lens element formed of a negative lens element and a positive lens element cemented to each other, and a positive lens element. The third lens unit L3 includes, sequentially from the object side to the image side, an aperture stop S, a cemented lens element formed of a negative lens element and a positive lens element cemented to each other. The fourth lens unit L4 includes, sequentially from the object side to the image side, a positive lens element, and a cemented lens element formed of a negative lens element and a positive lens element cemented to each other.

In the present embodiment, in zooming from the wide-angle end to the telephoto end, the first lens unit L1 moves toward the image side, and then moves toward the object side. That is, the first lens unit L1 moves along part of a locus that is convex toward the image side. The second, third and the fourth lens units L2, L3, and L4 move toward the object side independently of each other. Specifically, the second lens unit L2 monotonously moves toward the object side. The third lens unit L3 moves toward the object side together with the aperture stop S so as to increase the distance between the second lens unit L2 and the third lens unit L3. The fourth lens unit L4 moves toward the object side so as to decrease the distance between the third lens unit L3 and the fourth lens unit L4. Focusing is performed by moving the first-b lens unit L1b of the first lens unit L1 in the optical axis direction.

In the first embodiment, when zooming from the wide-angle end to the telephoto end is performed, the second, third, and the fourth lens units L2, L3, and L4 are used to vary the magnification, and the first lens unit L1 is moved so as to correct an image plane that moves as the magnification varies. By moving the four lens units in zooming, a desired zoom ratio is easily obtained and variations in a variety of aberrations due to zooming are suppressed. The zoom lens system of the second embodiment illustrated in FIGS. 4A and 4B includes, sequentially from the object side to the image side, the first lens unit L1 having a negative refractive power, and the second lens unit L2 having a positive refractive power.

The first lens unit L1 includes, sequentially from the object side to the image side, the first-a lens unit L1a having a negative refractive power and the first-b lens unit L1b for focusing having a negative refractive power. The first-a lens unit L1a includes, sequentially from the object side to the image side, a negative lens element having a meniscus shape and having a convex surface on the object side, a negative lens element having a meniscus shape and having a convex surface on the object side, a negative lens element, and a positive lens element. The first-b lens unit L1b includes a single negative lens element. The second lens unit L2 includes, sequentially from the object side to the image side, a sub-aperture SS, a positive lens element, an aperture stop S, a cemented lens element formed of a negative lens element and a positive lens element cemented to each other, a cemented lens element formed of a positive lens element and a negative lens element cemented to each other, a positive lens element, a cemented lens element formed of a negative lens element and a positive lens element cemented to each other, and a positive lens element.

In the present embodiment, the distance between the first lens unit L1 and the second lens unit L2 along the optical axis changes during zooming. Focusing is performed by moving the first-b lens unit L1b of the first lens unit L1 in the optical axis direction. In the second embodiment, when zooming from the wide-angle end to the telephoto end is performed, the second lens unit L2 is monotonously moved toward the object side in order to vary the magnification, and the first lens unit L1 is moved along part of a locus that is convex toward the image side in order to correct an image plane that moves as the magnification varies.

In the zoom lens of each embodiment, the first lens unit L1 having a negative refractive power includes the first-a lens unit L1a having a negative refractive power and the first-b lens unit L1b having a negative refractive power. Focusing is performed by moving the first-b lens unit L1b in the optical axis direction.

In order to suppress variations in chromatic aberration that occur in focusing, the first-a lens unit L1a includes the positive lens element and the negative lens element so as to suppress the occurrence of chromatic aberration. A focus lens unit is disposed closer to the image side than the first-a lens unit L1a is in order to suppress effects caused by off-axis rays. In order to suppress effects caused by axial rays having been diffused by the first-a lens unit L1a having a negative refractive power, the first-b lens unit L1b having a negative refractive power is formed of the single negative lens element having a concave surface facing the object side, thereby suppressing variations in spherical aberration, coma aberration, and so forth. When f1b is a focal length of the first-b lens unit L1b, and fw is a focal length of the entire zoom lens at the wide-angle end, the following conditional expression is satisfied:

$$-0.4 < fw/f1b < -0.1 \quad (1)$$

Conditional expression (1) specifies a ratio of the focal length of the first-b lens unit L1b, which is the focus lens unit, to the focal length of the entire zoom lens at the wide-angle end. When the upper limit of conditional expression (1) is exceeded, the negative refractive power of the focus lens unit reduces. This increases a moving amount required in focusing, and accordingly, increases the size of the entire zoom lens. This is not a desired situation. When the lower limit of conditional expression (1) is exceeded, the refractive power of the focus lens unit exceedingly increases. This increases variations in aberration caused in focusing. This is not a desired situation. The numerical value range of condition expression (1) is more preferably set as follows:

$$-0.4 < fw/f1b < -0.15 \quad (1a)$$

As described above, according to each embodiment, the zoom lens can be obtained, which includes the focus lens unit that is sufficiently right in weight, exhibits small variations in aberrations (chromatic aberration in particular) in focusing, and is suited for taking movies.

According to each embodiment, in a negative-lead zoom lens, the lens structure of the first lens unit L1 is optimized as described above. Thus, the zoom lens is obtained, which has a wide field angle, can correct chromatic aberration in focusing, and has high optical characteristics. In the zoom lens according to each embodiment, in order to further increase the field angle, reduce variations in aberration in focusing, and achieve a good optical performance, preferably, one or more of the following conditions can be satisfied:

$$Qp = \Sigma(\theta gFpi/fpi)/\Sigma(1/fpi)$$

$$Qn = \Sigma(\theta gFni/fni)/\Sigma(1/fni)$$

where, in the first-a lens unit, θgFpi and fpi are respectively a partial dispersion ratio and the focal length of the ith positive lens element closest to the object, and θgFni and fni are respectively a partial dispersion ratio and the focal length of the ith negative lens element closest to the object.

When r1 is a radius of curvature of an object side lens surface and r2 is a radius of curvature of an image side lens surface of the negative lens element in the first-b lens unit L1b, Lw is a total lens length and BF is a back focus distance at the wider-angle end of the zoom lens, Df is a thickness of the first-b lens unit L1b along the axis, and ΣD is the sum of thicknesses of the lenses along the axis included in the entire zoom lens, one or more of the following conditional expressions can be satisfied:

$$|Qp-Qn| \leq 0.1 \quad (2)$$

$$-2.0 \leq (r1-r2)/(r1+r2) \leq -0.3 \quad (3)$$

$$2 < Lw/BF < 5 \quad (4)$$

$$0.01 < Df/\Sigma D < 0.10 \quad (5)$$

Next, technical meaning of each conditional expression above will be described. In focusing, it is important to reduce variations in chromatic aberration. In order to suppress variations in chromatic aberration, the occurrence of chromatic aberration by the first-a lens unit L1a can be suppressed, and the first-b lens unit L1b for focusing can be disposed at a position where distances between off-axis rays and the optical axis are small. For these purposes, the first-a lens unit L1a is structured as described below.

Conditional expression (2) relates to partial dispersion ratios of materials of the positive and negative lens elements and focal lengths of the lens elements included in the first-a lens unit L1a, and mainly specifies selection of lens materials in order to suppress chromatic aberration. When the upper limit of conditional expression (2) is exceeded, the occurrence of chromatic aberration by the first-a lens unit L1a increases, thereby increasing variations in chromatic aberration caused by focusing. Conditional expression (2) is more preferably set as follows:

$$|Qp-Qn| \leq 0.07 \quad (2a)$$

In order to suppress aberrations other than chromatic aberration, in particular aberrations attributable to the axial rays such as spherical aberration and coma aberration, it is important that the incidence angles of the axial rays that enter the focus lens unit do not significantly change while focusing is performed. That is, when the rays are diffused rays, the lens element can be a negative lens whose lens surface on the object side has a concave shape. For this purpose, conditional expression (3) specifies the shape of the negative lens element (negative lens unit) included in the first-b lens unit L1b.

When the upper limit of conditional expression (3) is exceeded, the shape of the lens element becomes a shape having resistance against the occurrence of aberrations. However, with the lens element formed to have that shape, refractive power is decreased. This increases a moving amount in focusing, and accordingly, increases the size of the zoom lens. When the lower limit of conditional expression (3) is exceeded, the incidence angles of the axial rays significantly change in focusing, thereby increasing variations in aberrations. The numerical value range of condition expression (3) is more preferably set as follows:

$$-1.5 \leq (r1-r2)/(r1+r2) \leq -0.7 \quad (3a)$$

Conditional expression (4) specifies the length of the entire zoom lens (the total lens length, that is, the distance between the first lens surface to the image plane) and the back focus distance at the wide-angle end in order to reduce the entire zoom lens in size while ensuring a long back focus distance. When the upper limit of conditional expression (4) is exceeded, the total lens length increases, and the effective diameter of the front lens element increases. When the lower limit of conditional expression (4) is exceeded, the refractive power of each lens unit increases, thereby making correction of aberrations be difficult. The numerical value range of condition expression (4) is more preferably set as follows:

$$2.2 < Lw/BF < 4.0 \quad (4a)$$

Conditional expression (5) specifies the thickness of the first-b lens unit L1b along the optical axis. When the upper limit of conditional expression (5) is exceeded, the lens unit is increased in size and weight, thereby making high-speed focusing be difficult. When the lower limit of conditional expression (5) is exceeded, the thickness at the center of the first-b lens unit L1b decreases, thereby making production of the first-b lens unit L1b be difficult. The numerical value range of condition expression (5) is more preferably set as follows:

$$0.025 < Df/\Sigma D < 0.050 \quad (5a)$$

In each embodiment, an air lens between the first-a lens unit L1a and the first-b lens unit L1b is defined by lens surfaces convex toward the image side, and both lens surfaces tend to have radii of curvature close to each other. Thus, the first-b lens unit L1b can have at least one or more aspherical surfaces. Specifically, the surface of the first-b lens unit L1b positioned on the side closest to the object can be formed into an aspherical surface shape. This facilitates suppression of variations of the image plane in focusing.

The zoom lens according to the present invention is sufficient when a zoom lens includes, sequentially from the object side to the image side, the first lens unit having a negative refractive power and the second lens unit having a positive refractive power, and the distance between the lens units changes during zooming. In the zoom lens according to the present invention, a lens unit having a refractive power such as a converter lens or an afocal lens unit can be positioned on at least one of the object side of the first lens unit L1 and the image side of the last lens unit.

As described above, according to each embodiment, the zoom lens can be obtained, which includes a compact focus lens unit, exhibits small variations in aberrations (chromatic aberration in particular) in zooming, and has high optical performance. In addition, an interchangeable lens device including the zoom lens, and an image pickup apparatus including the interchangeable lens device can be obtained.

Next, an embodiment in which the zoom lens in the first or second embodiment is used in an image pickup apparatus will be described with reference to FIG. 7. An image pickup apparatus according to the present invention includes an interchangeable lens device including a zoom lens, and a camera body to which the interchangeable lens device is removably connected using a camera mount portion. The camera body includes an image pickup device that receives an optical image formed by the zoom lens and converts the received optical image into an electrical image signal.

FIG. 7 is a schematic diagram illustrating a main portion of a single-lens reflex camera. In FIG. 7, an image taking lens 10 includes a zoom lens 1 according to the first or second embodiment. The zoom lens 1 is held by a lens barrel 2 that is a holding member. A camera body 20 includes a quick return mirror 3 and a focusing plate 4. The quick return mirror 3 reflects a beam from the image taking lens 10 upward, and the focusing plate 4 is disposed at a position where the image taking lens 10 forms an image. The camera body 20 also includes a penta roof prism 5, an eyepiece 6, and so forth. The penta roof prism 5 converts an inverted image formed on the focusing plate 4 into an erect image, and the eyepiece 6 is used for observing the erect image.

A photosensitive surface 7 includes a solid-state image pickup device (photoelectric conversion device) such as a CCD sensor or a CMOS sensor, or silver-halide film that receives an image formed by the zoom lens. When an image is taken, the quick return mirror 3 is moved away from an optical path so as to allow the image taking lens 10 to form an image on the photosensitive surface 7. Advantages described in the first and second embodiments are effectively achieved with the image pickup apparatus as disclosed in the present embodiment.

First and second numerical examples, which correspond to the first and second embodiments, will be listed below. In each numerical example, a "Surface No." (surface number) represents an ordinal position of a surface from the object side. In each numerical example, when a surface number is i (i being a positive integer, e.g., i=1, 2, 3 . . . ), "ri" denotes a radius of curvature of an ith lens surface closest to the object, "di" denotes an ith lens thickness or an air gap closest to the object, and "ndi" and "υdi" respectively denote a refractive index and the Abbe number of a material of an ith lens closest to the object. "BF" denotes the back focus distance. When a give surface is aspherical, the aspherical surface number is denoted by an asterisk (*) next to the number. The aspherical surface shape is given by the following equation:

$$X = \frac{H^2/r}{1+(1-(H/r)^2)^{1/2}} + A4 \cdot H^4 + A6 \cdot H^6 + A8 \cdot H^8 + A10 \cdot H^{10} + A12 \cdot H^{12}$$

where the X-axis represents the optical axis direction, the H-axis represents a direction perpendicular to the optical axis, the moving direction of light is assumed to be positive, r is a paraxial radius of curvature, A4, A6, A8, A10, and A12 are respective aspherical surface coefficients. In each aspherical surface coefficient, e-x represents $10^{-x}$. The relationships between the above-described conditional expressions and the numerical examples are shown in Table.

FIRST NUMERICAL EXAMPLE

Unit: mm

Surface Data

| Surface No. | r | d | nd | vd | Effective diameter |
|---|---|---|---|---|---|
| 1 | 85.814 | 3.50 | 1.58313 | 59.4 | 51.83 |
| 2* | 12.150 | 12.84 | | | 31.65 |
| 3* | 82.577 | 1.07 | 1.83481 | 42.7 | 30.63 |
| 4 | 24.728 | 1.76 | | | 28.27 |
| 5 | 24.951 | 7.72 | 1.64769 | 33.8 | 28.42 |
| 6 | −84.939 | 4.70 | | | 27.41 |
| 7* | −48.110 | 1.80 | 1.74100 | 52.6 | 22.43 |
| 8 | 791.370 | (variable) | | | 21.21 |
| 9 | 31.901 | 0.89 | 1.90366 | 31.3 | 20.84 |
| 10 | 19.866 | 5.77 | 1.49700 | 81.5 | 20.67 |
| 11 | −50.208 | 0.15 | | | 21.07 |
| 12 | 37.448 | 2.95 | 1.67790 | 55.3 | 21.45 |
| 13 | −166.162 | (variable) | | | 21.28 |
| 14 (aperture stop) | ∞ | 1.46 | | | 19.02 |
| 15 | −55.849 | 0.90 | 1.60311 | 60.6 | 18.78 |
| 16 | 19.715 | 1.73 | 1.80809 | 22.8 | 18.41 |
| 17 | 26.931 | (variable) | | | 18.20 |
| 18 | 21.636 | 6.77 | 1.59282 | 68.6 | 21.00 |
| 19 | −31.620 | 0.20 | | | 21.16 |
| 20* | −76.613 | 0.84 | 1.85400 | 40.4 | 20.81 |
| 21 | 16.324 | 8.88 | 1.48749 | 70.2 | 21.03 |
| 22 | −37.172 | (variable) | | | 22.79 |
| Image plane | ∞ | | | | |

Aspherical Surface Data

Surface 2

$K = -5.73958e-001$   $A4 = -3.31917e-006$   $A6 = -2.25126e-008$   $A8 = -3.99746e-011$

Surface 3

$K = 0.00000e+000$   $A4 = -1.96859e-006$   $A6 = -1.73017e-008$   $A8 = 5.23762e-011$
$A10 = -1.15220e-015$

Surface 7

$K = 0.00000e+000$   $A4 = 3.98392e-006$   $A6 = 7.81336e-009$   $A8 = -6.88826e-011$

Surface 20

$K = 0.00000e+000$   $A4 = -1.71627e-005$   $A6 = -1.36689e-008$   $A8 = -3.49811e-011$
$A10 = 3.08747e-013$

Miscellaneous Data

| | Wide-angle | Middle | Telephoto |
|---|---|---|---|
| Focal length | 17.64 | 23.00 | 39.05 |
| F-number | 2.64 | 3.04 | 4.10 |
| Field angle | 50.80 | 43.25 | 28.99 |
| Image height | 21.64 | 21.64 | 21.64 |
| Total lens length | 134.67 | 132.15 | 136.70 |
| BF | 39.97 | 8.70 | 64.95 |
| d8 | 17.73 | 9.75 | 1.06 |
| d13 | 1.24 | 1.26 | 5.84 |
| d17 | 11.79 | 8.50 | 0.92 |
| d22 | 39.97 | 48.70 | 64.95 |

Zoom Lens Unit Data

| Lens unit | Most object side length | Focal structure | Lens surface length | Front principal-point position | Back principal-point position |
|---|---|---|---|---|---|
| 1 | 1 | −19.62 | 33.38 | 5.48 | −18.75 |
| 2 | 9 | 25.99 | 9.76 | 3.64 | −2.82 |
| 3 | 14 | −32.75 | 4.09 | 2.75 | −0.21 |
| 4 | 18 | 39.96 | 16.70 | 2.77 | −9.19 |

SECOND NUMERICAL EXAMPLE

| | | Unit: mm | | | |
|---|---|---|---|---|---|
| | | Surface Data | | | |
| Surface No. | r | d | nd | νd | Effective diameter |
| 1 | 59.840 | 2.50 | 1.80400 | 46.6 | 61.87 |
| 2 | 17.282 | 14.64 | | | 34.15 |
| 3 | 129.723 | 1.61 | 1.59282 | 68.6 | 32.59 |
| 4 | 21.610 | 6.44 | | | 27.39 |
| 5 | −86.935 | 1.36 | 1.59282 | 68.6 | 27.10 |
| 6 | 31.102 | 0.15 | | | 25.84 |
| 7 | 22.525 | 7.45 | 1.80518 | 25.4 | 26.07 |
| 8 | −110.226 | 5.82 | | | 24.72 |
| 9* | −31.089 | 1.20 | 1.85135 | 40.1 | 17.80 |
| 10 | −844.340 | (variable) | | | 17.08 |
| 11 | ∞ | 1.46 | | | 10.26 |
| 12 | 43.413 | 1.62 | 1.88300 | 40.8 | 10.87 |
| 13 | −94.260 | 1.85 | | | 10.94 |
| 14 (aperture stop) | ∞ | 1.70 | | | 10.95 |
| 15 | −19.292 | 0.75 | 1.88300 | 40.8 | 10.96 |
| 16 | 32.493 | 3.22 | 1.51823 | 58.9 | 11.53 |
| 17 | −20.261 | 0.20 | | | 12.31 |
| 18 | 194.716 | 4.25 | 1.48749 | 70.2 | 12.74 |
| 19 | −12.377 | 0.80 | 1.88300 | 40.8 | 13.21 |
| 20 | −27.182 | 0.20 | | | 13.96 |
| 21 | 712.893 | 3.28 | 1.59270 | 35.3 | 14.77 |
| 22 | −21.620 | 0.35 | | | 15.87 |
| 23 | −60941.798 | 0.93 | 1.83400 | 37.2 | 16.91 |
| 24 | 28.231 | 4.77 | 1.49700 | 81.5 | 17.60 |
| 25 | −34.279 | 0.20 | | | 18.70 |
| 26 | −80910.795 | 1.68 | 1.48749 | 70.2 | 19.49 |
| 27 | −87.072 | (variable) | | | 19.87 |
| Image plane | ∞ | | | | |

Aspherical Surface Data

Surface 9

K = 0.00000e+000    A4 = −6.64162e−006    A6 = 2.58871e−008
A8 = −8.99837e−010    A10 = 1.12233e−011    A12 = −5.07106e−014

Miscellaneous Data

| | Wide-angle | Middle | Telephoto |
|---|---|---|---|
| Focal length | 8.05 | 11.85 | 15.14 |
| F-number | 4.12 | 4.12 | 4.12 |
| Field angle | 175 | 175 | 175 |
| Image height | 11.15 | 16.77 | 21.64 |
| Total lens length | 129.57 | 127.26 | 129.98 |
| BF | 40.25 | 49.58 | 57.66 |
| d10 | 20.89 | 9.25 | 3.89 |
| d27 | 40.25 | 49.58 | 57.66 |

Zoom Lens Unit Data

| Lens unit | Most object side surface | Focal length | Lens structure length | Front principal-point position | Back principal-point position |
|---|---|---|---|---|---|
| 1 | 1 | −10.91 | 41.17 | 10.51 | −15.41 |
| 2 | 11 | 26.80 | 27.26 | 15.90 | −6.32 |

Values corresponding to conditional expressions are shown in Table.

TABLE

| | Conditional expression | | | | |
|---|---|---|---|---|---|
| | (1) | (2) | (3) | (4) | (5) |
| First numerical example | −0.32 | 0.042 | −1.13 | 2.51 | 0.042 |
| Second numerical example | −0.21 | 0.067 | −0.93 | 3.22 | 0.034 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-184920 filed Aug. 20, 2010, which is hereby incorporated by reference herein in its entirety.

What is claimed is:

1. A zoom lens comprising:
a first lens unit having a negative refractive power; and
a second lens unit having a positive refractive power,
wherein the first lens unit and the second lens unit are arranged in order from an object side to an image side and are disposed along an optical axis of the zoom lens,
wherein a distance between each lens unit changes when zooming from a wide-angle end to a telephoto end,
wherein the first lens unit consists of
    a first lens sub-unit including a positive lens element and a negative lens element, and having a negative refractive power, and
    a second lens sub-unit consisting of a single negative lens element,
wherein focusing is performed by moving the second lens sub-unit in an optical axis direction, and
wherein, when a focal length of the second lens sub-unit is f1b and a focal length of the entire zoom lens at the wide-angle end is fw, the following conditional expression is satisfied:

$-0.4 < fw/f1b < -0.1$.

2. The zoom lens according to claim 1,
wherein, in the first lens sub-unit, when $\theta gFpi$ and $fpi$ are respectively a partial dispersion ratio and a focal length of an ith positive lens element, and $\theta gFni$ and $fni$ are respectively a partial dispersion ratio and a focal length of an ith negative lens element, and when $Qp = \Sigma(\theta gFpi/fpi)/\Sigma(1/fpi)$, and $Qn = \Sigma(\theta gFni/fni)/\Sigma(1/fni)$, the following conditional expression is satisfied:

$|Qp - Qn| 0.1$.

3. The zoom lens according to claim 1,
wherein, when r1 is a radius of curvature of an object side lens surface and r2 is a radius of curvature of an image side lens surface of the negative lens element of the second lens sub-unit, the following conditional expression is satisfied:

$-2.0 \leq (r1-r2)/(r1+r2) \leq -0.3$.

4. The zoom lens according to claim 1,
wherein, when Lw is a total lens length and BF is a back focus distance at the wide-angle end of the zoom lens, the following conditional expression is satisfied:

$2 < Lw/BF < 5$.

5. The zoom lens according to claim 1,
wherein, when Df is a thickness of the second sub-lens unit along the optical axis, and $\Sigma D$ is the sum of thicknesses of the lens elements included in the entire zoom lens along the optical axis, the following conditional expression is satisfied:

$0.01 < Df/\Sigma D < 0.10$.

6. The zoom lens according to claim 1,
wherein the zoom lens consists of the first lens unit having a negative refractive power, the second lens unit having a positive refractive power, a third lens unit having a negative refractive power, and a fourth lens unit having a positive refractive power,
wherein the first, second, third and fourth lens units are arranged sequentially from the object side to the image side,
wherein, in zooming from the wide-angle end to a telephoto end, the first lens unit moves along part of a locus that is convex toward the image side, and the second, third and fourth lens units move toward the object side.

7. The zoom lens according to claim 1,
wherein the zoom lens consists of the first lens unit having a negative refractive power, and the second lens unit having a positive refractive power,
wherein the first and second lens units are arranged sequentially from the object side to the image side,
wherein, in zooming from the wide-angle end to a telephoto end, the first lens unit moves along part of a locus that is convex toward the image side, and the second lens unit monotonously moves toward the object side.

8. An image pickup apparatus, comprising:
an interchangeable lens device including the zoom lens according to claim 1, and
a camera body to which the interchangeable lens device is removably connected using a camera mount portion, the camera body including an image pickup device that receives an optical image formed by the zoom lens and converts the received optical image into an electrical image signal.

* * * * *